(12) United States Patent
Stassen

(10) Patent No.: US 11,551,118 B2
(45) Date of Patent: Jan. 10, 2023

(54) TUNING IMPLEMENTATION OF MACHINE LEARNING MODEL FOR RESOURCE-CONSTRAINED DEVICE

(71) Applicant: KONINKLIJKE PHILIPS N.V., Eindhoven (NL)

(72) Inventor: Maurice Leonardus Anna Stassen, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 375 days.

(21) Appl. No.: 16/852,709

(22) Filed: Apr. 20, 2020

(65) Prior Publication Data
US 2020/0387807 A1 Dec. 10, 2020

Related U.S. Application Data
(60) Provisional application No. 62/857,356, filed on Jun. 5, 2019.

(51) Int. Cl.
*G06N 5/04* (2006.01)
*G06N 20/00* (2019.01)

(52) U.S. Cl.
CPC ............... *G06N 5/04* (2013.01); *G06N 20/00* (2019.01)

(58) Field of Classification Search
CPC ........ G06N 5/04; G06N 20/00; G06N 3/0427; G06N 3/0454; G06N 3/0472; G06N 3/088; G06N 7/005; G06N 20/10; G06N 3/063; G06N 3/0445; H04L 41/5041; H04L 43/062; H04L 67/12; H04L 67/306
See application file for complete search history.

(56) References Cited

U.S. PATENT DOCUMENTS

| | | | |
|---|---|---|---|
| 10,942,754 B2* | 3/2021 | Kern | G06F 8/34 |
| 10,963,810 B2* | 3/2021 | Dirac | G06N 20/00 |
| 11,063,881 B1* | 7/2021 | Vijayasuganthan | G06N 3/0454 |
| 2018/0189229 A1 | 7/2018 | Boesch et al. | |
| 2019/0385043 A1* | 12/2019 | Choudhary | G06N 3/084 |
| 2020/0327371 A1* | 10/2020 | Sharma | G06N 20/00 |
| 2021/0133620 A1* | 5/2021 | Frank | G06N 3/0454 |

OTHER PUBLICATIONS

NXP Docs from NXP Blog Posts. "NXP Elevates Its Leadership in Artificial Intelligence and Machine Learning". Jun. 15, 2018. http://blog.nxp.com/uncategorized/nxp-elevates-its-leadership-in-artificial-intelligence-and-machine-learning.

(Continued)

*Primary Examiner* — El Hadji M Sall

(57) ABSTRACT

The present disclosure is directed to methods and apparatus for tuning implementations of machine learning models for resource-constrained devices. In various embodiments, computer-readable instructions that utilize a trained machine learning model during execution of the computer-readable instructions on a resource-constrained device may be evaluated. Based on the evaluating, it may be determined that an amount of a first computing resource required by the resource-constrained device to execute the computer-readable instructions fails to satisfy a constraint related to the first computing resource. Based on the constraint, one or more candidate alterations to the computer-readable instructions may be identified.

15 Claims, 6 Drawing Sheets

(56) References Cited

OTHER PUBLICATIONS

Texas Instruments Deep Learning (TIDL) for Sitara Processors. Overview. https://training.ti.com/texas-instruments-deep-learning-tidl-overview.
STM32 Solutions for Artificial Neural Networks. https://www.st.com/content/st_com/en/stm32-ann.html.
Designer's Guide: Selecting AI chips for embedded designs. https://www.electronicproducts.com/Digital_ICs/Designer_s_Guide_Selecting_AI_chips_for_embedded_designs.aspx.
Artificial Intelligence (AI)—St Microelectronics. https://www.electronicproducts.com/Digital_ICs/Designer_s_Guide_Selecting_AI_chips_for_embedded_designs.aspx.

\* cited by examiner

| SOLUTION QUADRANT | POSSIBLE SOLUTIONS | PROBLEM | | |
|---|---|---|---|---|
| | | FLASH | RAM | CYCLES |
| 102 | REDUCE ML MODEL | ✓ | ✓ | ✓ |
| 102 | REDUCE INPUT SIZE | | ✓ | ✓ |
| 106 | OPTIMIZE EXECUTION ORDER | | ✓ | |
| 102-106 | USE SMALLER VAR TYPE | ✓ | ✓ | ✓ |
| 104-106 | LOSSLESS WEIGHT COMPRESSION | ✓ | | |
| 102-106 | LOSSY WEIGHT COMPRESSION | ✓ | | |
| 104 | OPTIMIZE LAYER IMPLEMENTATION | | | ✓ |
| 102-106 | USE MICROCONTROLLER W/MORE FLASH | ✓ | | |
| 102-106 | USE MICROCONTROLLER W/MORE RAM | | ✓ | |
| 102-106 | USE MICROCONTROLLER W/MORE CPU POWER | | | ✓ |

…

TUNING IMPLEMENTATION OF MACHINE LEARNING MODEL FOR RESOURCE-CONSTRAINED DEVICE

TECHNICAL FIELD

Various embodiments described herein are directed generally to implementing artificial intelligence on resource-constrained devices. More particularly, but not exclusively, various methods and apparatus disclosed herein relate to tuning implementation of machine learning models for resource-constrained devices.

BACKGROUND

Artificial intelligence such as machine learning models are becoming more commonplace and are increasingly being used for new types of applications. Some newer types of machine learning models, such as deep neural networks, outperform classical machine learning models at complex tasks such as controlling autonomous vehicles, surveillance, handwriting recognition, typing prediction, and so forth. However, in order to perform these tasks, deep neural networks are typically implemented on relatively powerful computing systems, such as server(s) forming part of what is often referred to as the "cloud."

Some of the applications for which machine learning models are being trained may be associated with computing devices having relatively limited resources such as processing power, battery life, and/or memory. Such devices are referred to herein as "resource-constrained devices," and may include anything from smart phones to consumer appliances such as toothbrushes or clothes irons. Particularly in the case of consumer appliances, it may be desired to utilize relatively low-power computing components such as microprocessors and/or memory (e.g., FLASH, RAM) in order to keep down costs.

It is possible to delegate machine learning model utilization from resource-constrained devices to the cloud. However, this may require the resource-constrained devices to be equipped with wired and/or wireless network communication components, which may increase their complexity and/or cost. Moreover, a network communication channel between a resource-constrained device and the cloud may be a performance bottleneck when available, and may be a hindrance if the communication channel is degraded or unavailable.

SUMMARY

The present disclosure is directed to methods and apparatus for tuning implementations of machine learning models for resource-constrained devices. As used herein, an "implementation" of the machine learning model may include the model data itself, including weights and other values that are "learned" during training of the model. The implementation may also include various computer-readable instructions (e.g., generated using programming language such as C, C++, Python, Java, etc.) that, when executed, employ the trained model to make various inferences based on input data. Thus, implementations described herein relate to not only tuning the machine learning model itself, but also to tuning various attributes of the surrounding computer-readable instructions ("software/firmware") so that the implementation of the trained machine learning model can operate one a resource-constrained device in a manner that satisfies commercial and/or technical constraints.

In various embodiments, computer-readable instructions that utilize a trained machine learning model during execution on a resource-constrained device may be evaluated. For example, embedded firmware of a resource-constrained consumer appliance (e.g., a "smart" electric shaver, a "smart" toothbrush, a "smart" iron, etc.) may utilize a trained machine learning model for various purposes. Based on the evaluating, an amount of a computing resource, such as non-volatile or read-only memory ("ROM", in some cases "FLASH" memory), random access memory ("RAM"), and/or processing cycles (or more generally, computational power), that are required by the resource-constrained device to execute the computer-readable instructions may be determined. If the amount fails to satisfy some constraint related to the first computing resource—e.g., too much ROM or RAM is required, or too much computational power is required—candidate alterations to the computer-readable instructions may be identified. In some embodiments, the candidate alteration(s) may be associated with the constraint in a data structure such as a lookup table or "problem-solution matrix."

Various types of resource-constrained devices may utilize trained machine learning models for various purposes. A smart toothbrush might apply a plurality of data points, such as accelerometer data generated by the toothbrush, timing data (e.g., how long does the consumer brush his or her teeth), and so forth, as input across a machine learning model. The model may generate output that indicates whether the individual has brushed long enough, has cleaned all reachable areas of the individual's mouth, etc. A smart iron might apply a plurality of data points gathered by its sensors (e.g., thermometer, accelerometer, hygrometer, etc.) across a trained machine learning model to determine, for instance, whether sufficient heat and/or stream has been applied to a garment, or whether there is a risk that the garment will be burned if the individual does not take remedial action. Techniques described herein may facilitate programming of these resource-constrained devices with software or firmware (e.g., embedded computer-readable instructions) that utilizes trained machine learning models.

Generally, in one aspect, a method implemented using one or more processors may include: evaluating computer-readable instructions that utilize a trained machine learning model during execution of the computer-readable instructions on a resource-constrained device; based on the evaluating, determining that an amount of a first computing resource of a plurality of computing resources required by the resource-constrained device to execute the computer-readable instructions fails to satisfy a constraint related to the first computing resource; and based on the determining, identifying one or more candidate alterations to the computer-readable instructions, wherein the one or more candidate alterations are associated with the constraint.

In various embodiments, the method may further include causing one or more computing devices to render output, wherein the output identifies the one or more candidate alterations to an individual in a position to alter the computer-readable instructions. In various embodiments, the computer-readable instructions comprise executable object code. In various embodiments, the method may further include: automatically updating source code underlying the object code in accordance with the one or more candidate alterations; and compiling the updated source code to generate updated object code.

In various embodiments, the first computing resource comprises read-only memory that stores information that remains constant during execution of the computer-readable instructions. In various embodiments, the first computing resource comprises volatile memory that stores information that changes during execution of the computer-readable instructions. In various embodiments, the first computing resource comprises computational power.

In addition, some implementations include one or more processors of one or more computing devices, where the one or more processors are operable to execute instructions stored in associated memory, and where the instructions are configured to cause performance of any of the aforementioned methods. Some implementations also include one or more non-transitory computer readable storage media storing computer instructions executable by one or more processors to perform any of the aforementioned methods.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTION OF THE DRAWINGS

In the drawings, like reference characters generally refer to the same parts throughout the different views. Also, the drawings are not necessarily to scale, emphasis instead generally being placed upon illustrating various principles of the embodiments described herein.

DETAILED DESCRIPTION

Artificial intelligence such as machine learning models are becoming more commonplace and are increasingly being used for new types of applications. Some newer types of machine learning models, such as deep neural networks, outperform classical machine learning models at complex tasks such as controlling autonomous vehicles, surveillance, handwriting recognition, typing prediction, and so forth. However, in order to perform these tasks, deep neural networks are typically implemented on relatively powerful computing systems, such as server(s) forming part of what is often referred to as the "cloud."

Some of the applications for which machine learning models are being trained may be associated with resource-constrained computing devices, which may include anything from smart phones to consumer appliances such as toothbrushes or clothes irons. Particularly in the case of consumer appliances, it may be desired to utilize relatively low-power computing components such as microprocessors and/or memory (e.g., FLASH, RAM) in order to keep down costs. Although it is possible to delegate machine learning model utilization from resource-constrained devices to the cloud, this may require the resource-constrained devices to be equipped with wired and/or wireless network communication components, increasing their complexity and/or cost. In view of the foregoing, various embodiments and implementations of the present disclosure are directed to generating and/or tuning computer-readable instructions that (i) operate trained machine learning models, and (ii) are nonetheless executable on resource-constrained devices.

Figures 1, 3:
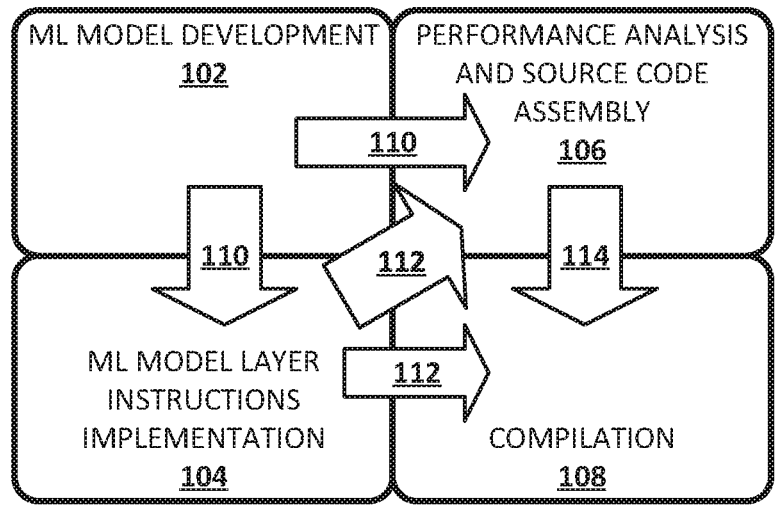
FIG. 1 illustrates an example process flow for tuning implementations of machine learning models for use with resource-constrained devices, in accordance with various embodiments.
FIG. 3 depicts an example problem-solution matrix for use with selected aspects of the present disclosure.

FIG. 1 illustrates example phases of tuning implementations of machine learning models for use with resource-constrained devices, in accordance with various embodiments. At top left, a first phase 102 relates to development of the machine learning ("ML") model itself. During first phase 102, various software tools may be employed, e.g., by entities such as machine learning model developers, artificial intelligence specialists or architects, statisticians, mathematicians, etc., to design and/or train a machine learning model. In some embodiments, the machine learning model developed during first phase 102 may include weights and/or other parameters that are agnostic to a particular implementation of the model. For example, in some embodiments, the machine learning model (before and/or after training) may be stored as a computer-readable file, such as a text file, that includes a table of values that correspond to values of the machine learning model. Such a file may be read from memory during execution of computer-readable instructions, e.g., so that the model can be applied to data to make inferences, classifications, etc.

As used herein, a machine learning model may refer to support vector machines, hidden Markov models, various flavors of neural networks (e.g., recurrent, long short-term memory or "LSTM," convolutional, generative adversarial, feed-forward, graph, graph convolution), ensembles of machine learning models, and so forth. Particularly in the case of neural networks, a machine learning model often will include multiple layers, some of which are often referred to as "hidden layers." Each layer may be connected to one or more downstream and/or upstream layers.

Referring back to FIG. 1, a second phase 104 relates to implementation specific computer-readable instructions for portions of the machine learning model. Data 110 indicative of the trained neural network may be provided to entities such as computer programmers, software engineers, etc. that are associated with second phase 104. As mentioned previously, a neural network developed during first phase 102 may include different types of layers. During second phase 104, different source code functions (or more generally, snippets) may be leveraged, e.g., from a machine learning library or application programming interface ("API"), to implement each type of layer of the machine learning model. In some embodiments, during second phase 104, programming languages such as C or C++ may be used to create and/or modify these layer-specific functions. Additionally or alternatively, if there is sufficient need for fine-tuning, assembly code that implements layers of the machine learning model may be modified during second phase 104, e.g., to achieve incremental gains in computing resource conservation.

During a third phase 106, data 110 indicative of the trained machine learning model generated during first phase 102, as well as additional data 112 associated with the snippets/functions of computer-readable instructions generated during second phase 104, may be provided to one or more entities associated with performance analysis and source code assembly. These entities may include, for instance, software engineers, hardware engineers, etc. These entities may employ various software, numerical computing, and/or machine learning model analysis tools evaluate the trained machine learning model (manifested in data 110) and/or the software snippets (manifested in data 112) to determine amounts of various types of computing resources being used and/or required to implement the final software that applies the trained machine learning model to data in order to perform inferences, classifications, etc.

Various types of computing resources may be required to execute the software (or firmware) that applies the trained machine learning model to data. Non-volatile memory or read-only memory ("ROM"), which may include FLASH memory, may be used to store computer-readable instructions, constants, and other data that remains constant during execution of the software/firmware that applies the machine learning model to data. Non-volatile memory is so-named because it retains its data after reset/power down.

By contrast, volatile memory such as random access memory ("RAM") is erased at each reset and/or shutdown. Volatile memory is used to store data such as intermediate data values calculated during application of the machine learning model. For example, each layer of the machine learning model may generate output that is passed as input to downstream layer(s). This output may be stored in volatile memory at least until it is no longer needed, e.g., if no more downstream layers require the output.

Another type of computing resource that is required to execute the software/firmware that applies the machine learning model to data is processor cycles. As mentioned previously, many resource-constrained devices may be equipped with relatively low power microprocessors, e.g., for cost savings and/or to conserve battery life. Moreover, some applications of machine learning models, such as applications deep neural networks by consumer products, may require that the deep neural network be traversed at a certain speed, e.g., to ensure the response time of the consumer product is not so great that the consumer will be dissatisfied. This speed of execution can be influenced by various factors, such how efficiently the machine learning model itself is trained to be during first phase 102, as well as how efficiently individual layers of the machine learning model are implemented during second phase 104.

During the performance evaluation of third phase 106, entities associated with third phase 106 may themselves make changes to the software/firmware that applies the machine learning model, and/or may request that entities associated with first and second phases 102-104 make changes to the software/firmware, in order to satisfy various commercial and/or technical constraints.

During a final phase 108, data 114 indicative of the final software/firmware, and in some cases additional data 112 associated with the snippets/functions of computer-readable instructions generated during second phase 104, may be provided to a compiler. The compiler may compile the various source code snippets, glue code, and/or other computer-readable instructions together into computer-executable object code. Thus, during final phase 108, object code is compiled that can then be stored in memory of a resource-constrained device. Thereafter, the resource-constrained device, and more particularly, one or more resource-constrained microprocessors of the resource-constrained device, may execute the object code in order to apply the trained machine learning model to data, e.g., to make inferences, classifications, etc.

Figure 2:
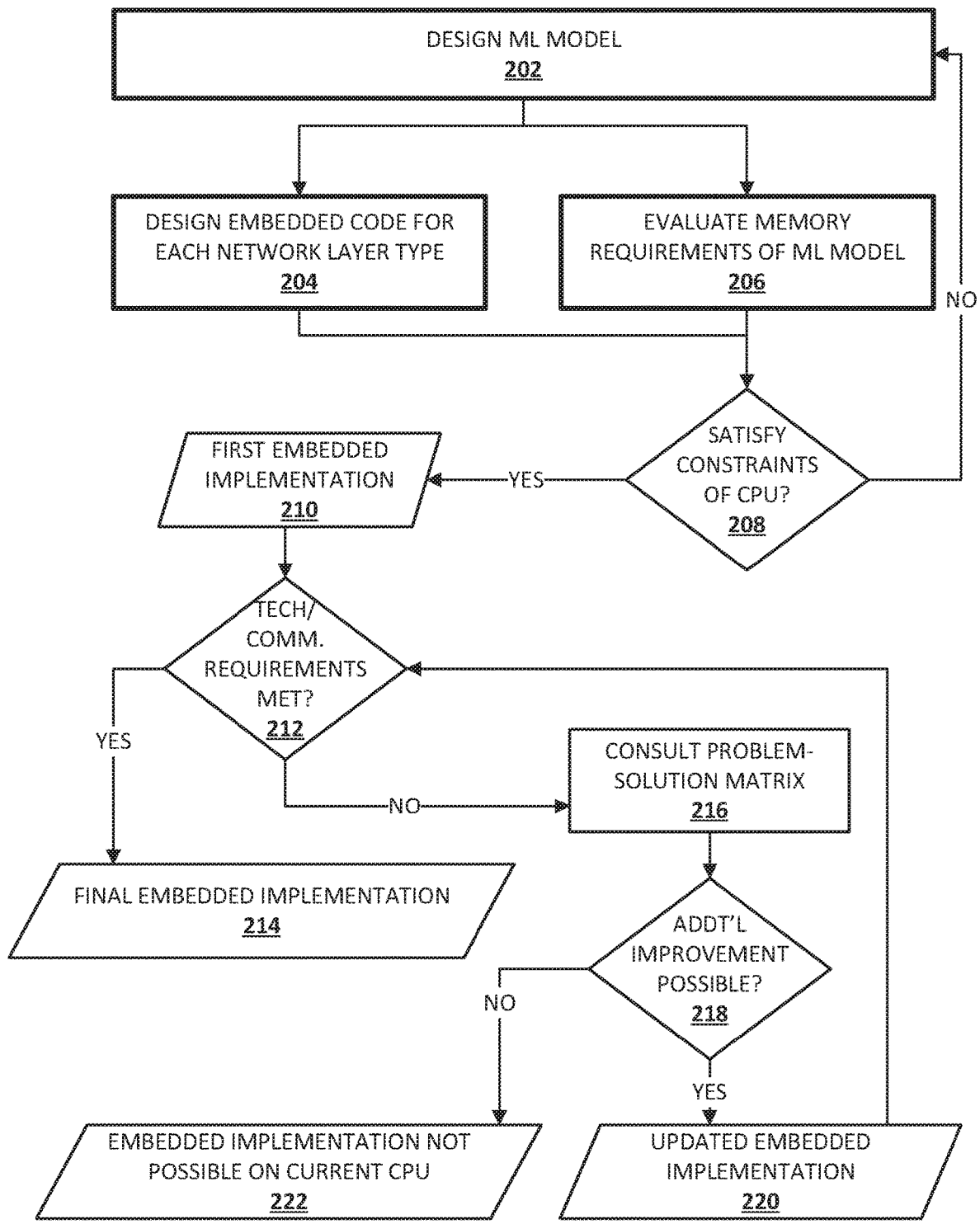
FIG. 2 depicts a flow chart that demonstrates one example of how the process flow of FIG. 1 may be followed to tune an implementation of a machine learning model for use with a resource-constrained device.

FIG. 2 depicts a flow chart that demonstrates one example of how the process flow of FIG. 1 may be followed to tune an implementation of a machine learning model for use with a resource-constrained device. At block 202, a machine learning model such as a deep neural network may be designed, e.g., during first phase 102 of FIG. 1. At block 204, embedded code may be selected/created/modified/customized for each layer of the machine learning model, e.g., as part of second phase 104 of FIG. 1. At block 206, which may correspond to third phase 106 of FIG. 1, memory requirements of the machine learning model, e.g., without regard to the ultimate computer-readable instructions that are executed to apply the machine learning model to data, may be evaluated. Blocks 204 and 206 may be performed in parallel in some embodiments, although this is not required.

At block 208, it may be determined, e.g., based on the embedded code generated at block 204 and/or the evaluation of block 206, whether one or more constraints imposed by a target microprocessor, such as a microprocessor considered for deployment as part of a resource-constrained device, are satisfied. Put another way, it may be determined whether the machine learning model and/or the constituent embedded layers selected/created to implement its layers will operate satisfactorily, or "fit," on the target microprocessor. If the answer is no, then the process flow may proceed back to block 202, and additional tuning may be performed at blocks 204-206. However, at block 208, if the answer is yes, then at block 210, a first embedded implementation of software/firmware that applies the machine learning model may be generated, e.g., compiled during the final phase 108 of FIG. 1.

Once the first embedded implementation 210 of the software/firmware is generated, at block 212, it may be determined whether all technical and/or commercial requirements or constraints are met. Technical requirements may include constrains such as application of the machine learning model be performed in "real time" or otherwise under some sort of time constraint in order to ensure proper operation of the resource-constrained device. For example, a smart iron that relies on a machine learning model to indicate whether it is ready to press a garment is not of much use if the garment is burned before the model completes its inference. Commercial requirements, which may overlap with technical requirements, may include maximum response times, maximum power usage (e.g., in order to preserve battery life of a resource-constrained device), maximum latency or lag (which can impact user experience), etc.

If all the technical and/or commercial requirements are determined at block 212 to be met, then at block 214, the current version of the embedded implementation may be deemed final. However, if the answer at block 212 is no, then at block 216, a data source having one or more candidate alterations that can be made to the embedded implementation of software/firmware may be consulted. In some embodiments, this data source may take the form of a "problem-solution" matrix or lookup table that associates various computing resource type criteria and various candidate solutions or alterations.

One example of a "problem-solution" matrix or lookup table is depicted in FIG. 3. The lookup table in FIG. 3 associates candidate solutions with problems in three domains of computing resource types—FLASH (or more generally, non-volatile memory), RAM (or more generally, volatile memory), and CYCLES (or more generally, computational power). The table also associates these solution-problem tuples with the solution quadrant, or phase, in which the solution is implemented. These quadrants correspond to the phases 102-108 of FIG. 1.

In some embodiments, the problem-solution matrix of FIG. 3 may be used as follows. Suppose a current implementation of software/firmware that applies a machine learning model uses too much FLASH (non-volatile memory), RAM (volatile memory), and computational power. The problem-solution matrix of FIG. 3 has two rows that are especially applicable in this scenario, the first and fourth rows. Any combination of the solutions proposed in these rows may be applied. The first row proposes an alteration to be made as part of the first phase 102 of the flow of FIG. 1, and simply proposes that the machine learning model be reduced in size, e.g., to have less layers, less nodes in one or more layers, etc. As part of the first phase 102, this alteration may involve redesigning the machine learning model itself, e.g., without necessarily tweaking source code built around the machine learning model.

The fourth row proposes an alteration to be made as part of any of phases 102-106 of FIG. 1. The solution proposed is to use a smaller variable type. Thus, for instance, during design of the machine learning model in the first phase 102, weights of the models or other parameters could be, for instance, rounded down to a smaller number of decimal points. Additionally or alternatively, during layer-specific design of the second phase 104, or during overall source code generation of the third phase 106, a different type of variable could be selected to reduce data size. For example, a variable type of "double" (64 bits) could be changed to "float" (32 bits) if it is determined that the float variable type will provide sufficient accuracy.

That is not to say that only the first and fourth rows are applicable in this situation. In fact, each individual problem may be addressed by a separate solution of the problem-solution matrix of FIG. 3. For example, the problem of using too much FLASH may be addressed using one or more of the solutions in any of the first, fourth, fifth, sixth, or eighth rows. Similarly, the problem of using too much RAM may be addressed using one or more of the solutions in any of the first-fourth rows, or the ninth row. And the problem of requiring too much computational power may be addressed using one or more of the solutions in any of the first, second, fourth, seventh, and tenth rows.

Suppose a current implementation of software/firmware that applies a machine learning model uses too much RAM, but is otherwise satisfactory. That means the variable values and other intermediate data created/manipulated during execution of the software/firmware is too much for the existing RAM. The problem-solution matrix of FIG. 3 has two rows that are directly applicable to both problems, the third and ninth rows, as well as rows that are applicable to the individual problems. In the third row the proposed solution is to optimize execution order of computer-readable instructions. This solution relates to the third phase 106 in FIG. 1. In the ninth row the proposed solution is to equip the resource-constrained device with a microcontroller having more RAM. This solution, which is more or less a "brute force" tactic, applies to any of the phases 102-106, and may in some cases be less desirable than the solution of the third row because the third row does require a hardware change (which may be cost prohibitive).

Suppose a current implementation of software/firmware that applies a machine learning model uses too much FLASH (or more generally, non-volatile memory), but is otherwise satisfactory. This means the available non-volatile memory for the program instructions and/or constants is too small. The problem-solution matrix of FIG. 3 has three rows that are applicable to both problems at once: the fifth, sixth, and eight rows. In the fifth row the proposed solution is to use lossless weight compression for the machine learning model weights. This solution relates to the second or third phases 104, 106 in FIG. 1. In the sixth row the proposed solution is to use lossy compression for the machine learning model weights, also applicable to the second or third phases 104-106. And the eighth row's brute force solution is to use a microcontroller with more FLASH—a solution that may be less desirable than the others because it requires a hardware change.

The remainder of the problem-solution matrix of FIG. 3 works similarly. For example, too many CPU cycles (or more generally, too much computational power) may suggest solutions of optimizing machine learning layer implementation in the second phase 104 (e.g., by modifying source code or even assembly language instructions), or using a microcontroller with more computational power (which may be less than ideal), which is indicated in FIG. 3 with "CPU power".

Referring back to FIG. 2, at block 218, if it is determined from the problem-solution matrix that an additional improvement is possible, then at block 220, the embedded implementation of the machine learning model may be updated. Otherwise, method 200 proceeds to block 222, at which point it is determined that an embedded implementation that satisfies all the technical/commercial requirements imposed by block 212 is not possible.

As noted previously, the desire to optimize software/firmware that applies machine learning models for use with resource-constrained devices relates in large part to cost. It is certainly possible to take a "brute force" approach that simply attempts to execute the software/firmware on the desired microcontroller to see if it works. But a disadvantage of this approach is that it is very difficult to predict whether or not it will succeed, making the approach very time consuming and inefficient. Moreover, even if the brute force approach succeeds it remains unknown whether there is a less expensive microcontroller that can execute the software/firmware that applies the machine learning model. Another disadvantage of the brute force approach is inflexibility. The design of a machine learning model is often a very iterative process, during which many changes will likely occur. For every change to the machine learning model, a non-trivial amount of re-implementation of the software/firmware that applies the machine learning model may be required. It may only be clear after the re-implementation whether the new software/firmware can still be implemented on the chosen microcontroller.

According, in various embodiments, the machine learning model itself may be evaluated, e.g., during the third phase 106 of FIG. 1, based on its weights and/or parameters, separately from the machine-readable instructions ultimately used to implement it. By testing the model itself separately from its underlying machine-readable instructions, unnecessary implementation and/or reimplementation of software/firmware that applies the machine learning model may be avoided. It also may aid in the selection of a suitable microprocessor for use in a resource-constrained device. As noted previously, there are three primary types of computing resources that contribute to whether software/firmware that applies a machine learning model can be implemented on a resource-constrained device: non-volatile memory, volatile memory, and computational power (e.g., processor cycles).

With regard to non-volatile memory, in various embodiments, an amount of non-volatile memory (e.g., FLASH) a machine learning model such as neural network needs may be calculated automatically. For example, a computer program may be created that steps through the entire machine learning model and records how much memory is needed for each of constant/weight of each machine learning model layer. In some embodiments, after determining the required amount of weights, this amount may be multiplied by the memory size in bytes of one element. For example if the weights are stored in floats, they may be multiplied by four bytes, or thirty-two bits, per value.

In addition to the weights of the machine learning model, there is also the matter of computer-readable instructions forming the software/firmware that applies the machine learning model. This is also stored in the non-volatile memory. In many cases this can be determined, for instance, by analyzing object code generated by a compiler, e.g., during the fourth phase 108, and/or from information some compilers provide about object code and/or assembly language they would generate based on source code. In any case, the size of the computer-readable instructions forming the software/firmware that applies the machine learning model is typically much smaller than the weights of the model itself.

With regard to volatile memory, the analysis may be a little more complex. In some embodiments, a plurality of layers in a machine learning model such as a neural network may be identified. A plurality of respective output sizes corresponding to the plurality of layers may be calculated, e.g., based on the number of individual layer outputs, the sizes of the individual layer outputs (e.g., float, int, double, etc.), and so forth. For example, if a given layer outputs ten float values, the output size for that layer may be 40 bytes (or 320 bits).

Based on the plurality of output sizes, a maximum amount of volatile memory used for application of the machine learning model may be estimated. This maximum amount may be determined in various ways. In some embodiments, the maximum amount may simply be a sum of all the plurality of output sizes used across all layers of the model. However, this approach does not take into account the fact that during application of the machine learning model, it is possible, and in some cases likely, that output from an early upstream layer may no longer be needed later during application of the machine learning model. This output from the early upstream layer may be occupying volatile memory that could be used for storing downstream layer output.

Accordingly, in some embodiments, the maximum amount of volatile memory may be a sum of a subset of the plurality of output sizes. For example, in some embodiments, the subset of the plurality of output sizes may exclude one or more output sizes of the plurality of output sizes that correspond to one or more layers of the plurality of layers that are no longer needed at a given point in time during application of the machine learning model. The one or more layers that are no longer needed may be, for instance, one or more layers that no longer feed any downstream layers of the plurality of layers at the given point in time. Put another way, output of no-longer-applicable upstream layers may be overwritten with output of currently-applicable downstream layers.

However the maximum amount of volatile memory is determined, it may then be compared to a volatile memory constraint of a resource-constrained computing device on which the machine learning model under consideration is intended for installation. For purposes of explanation, suppose a resource-constrained device on which a machine learning model is to be installed has 100 kB of RAM. If it is determined using techniques described herein that the maximum amount of volatile memory used for application of the machine learning model is 110 kB, visual or even audible output may be provided at one or more output components that indicates the machine learning model will not operate on the resource-constrained device.

Additionally, it is possible, even likely, that application of the machine learning model will require additional volatile memory beyond what's needed for layer outputs. For example, the computer-readable instructions forming the software/firmware that is executable to apply the machine learning model to data may require at least some volatile memory, e.g., for storing intermediate variable values. As another example, in some embodiments, volatile memory may also be used to store one or more internal states of the machine learning model, e.g., where the machine learning model is a recurrent neural network, a long short-term memory ("LSTM") network, a gated recurrent unit ("GRU") network, etc. In various embodiments, these additional memory "sinks" may also be taken into consideration when estimating the maximum amount of volatile memory used for application of the machine learning model.

Figure 4:
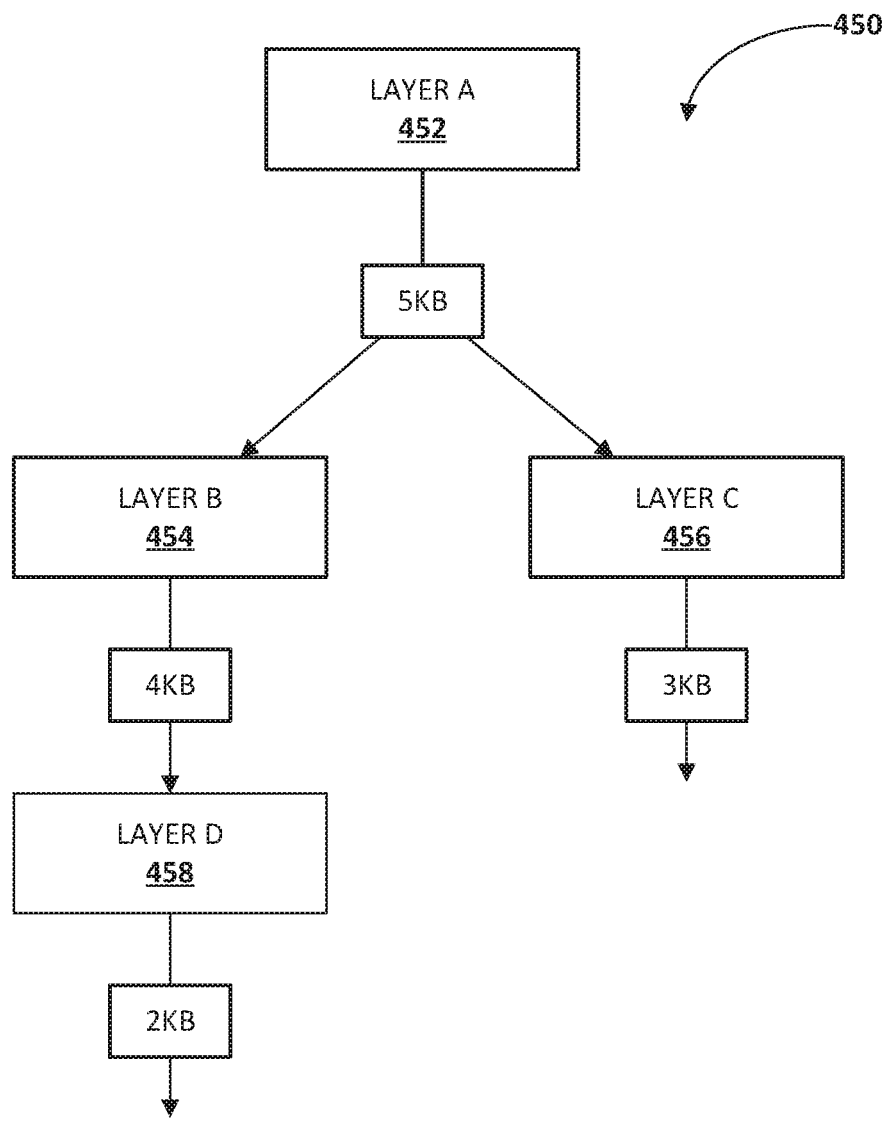
FIG. 4 depicts one example of how memory usage of an implementation of a machine learning model may be evaluated, in accordance with various embodiments.

FIG. 4 schematically depicts one example of how volatile memory requirements of a machine learning model may be estimated, in accordance with various embodiments. For this example, assume that the machine learning model under consideration is some flavor of neural network with at least four layers. The order at which these layers are applied to input data is depicted in a graph 450 of FIG. 4. Layer A 452 is applied first, and its output, which occupies 5 kB of volatile memory, is provided to both Layer B 454 and Layer C 456. Layer B 454 is applied second to generate 4 kB of data, followed by Layer C 456 which generates 3 kB of data. After application of Layer B 454, Layer D 458 may be applied to the output of Layer B 454 to generate 2 kB of data. These examples of output sizes are for illustrative purposes only With reference to graph 450, in some embodiments, evaluation of volatile memory usage may operate as follows. Graph 450 may be traversed in execution order. Layer A 452 is applied first and generates 5 kB of data, which requires 5 kB of volatile memory. Layer B 454 is applied next, and generates 4 kB of data. Next, or at least in parallel to application of Layer B 454, Layer C 456 is applied to output of Layer A 452. Until both Layer B 454 is finished being applied to output of Layer A 452 and Layer C 456 is finished being applied to output of Layer A 452, the output of Layer 452 A may be retained in volatile memory. Thus, until application of Layer C 456 is complete, 5 kB+4 kB+3 kB=12 kB of volatile memory are required.

However, once application of Layer C 456 to output of Layer A 452 is complete, output of Layer A 452 need not be preserved, and the volatile memory storing it may be freed or overwritten with new data. Continuing with this example, Layer D 458 is applied next to output of Layer B 454 to generate 2 kB of data. At this moment, then, 4 kB+3 kB+2 kB=9 kB of volatile memory are required. In some embodiments, the maximum amount of volatile memory determined with these calculations may be used to estimate the volatile memory requirements of the machine learning model. In this example, the maximum amount was 12 kB.

With regard to estimation of computational power, in various embodiments, some machine learning applications require a certain speed of the application of the machine learning model in order to make an inference. This can be due certain real-time requirement on the overall system, or requirements on usability. For example, a consumer may not appreciate output from a consumer device generated from a machine learning model if the output takes too long to generate, and especially if the output is generated after some decision point to which the output would be relevant has passed. In various embodiments, the computational load of a machine learning model may be estimated using a metric such as required number of multiply-accumulates ("MACs"). For example, a computer program may be configured to step through application of a machine learning model to sample data in order to count the number of MACs. In some embodiments, once the entire development process of FIG. 1 (phases 102-108) has been completed, a relationship between required MACs and actual execution time on a real microcontroller to be installed in a resource-constrained device may be determined. This may be especially clear given the choices made for second phase 104.

Figure 5:
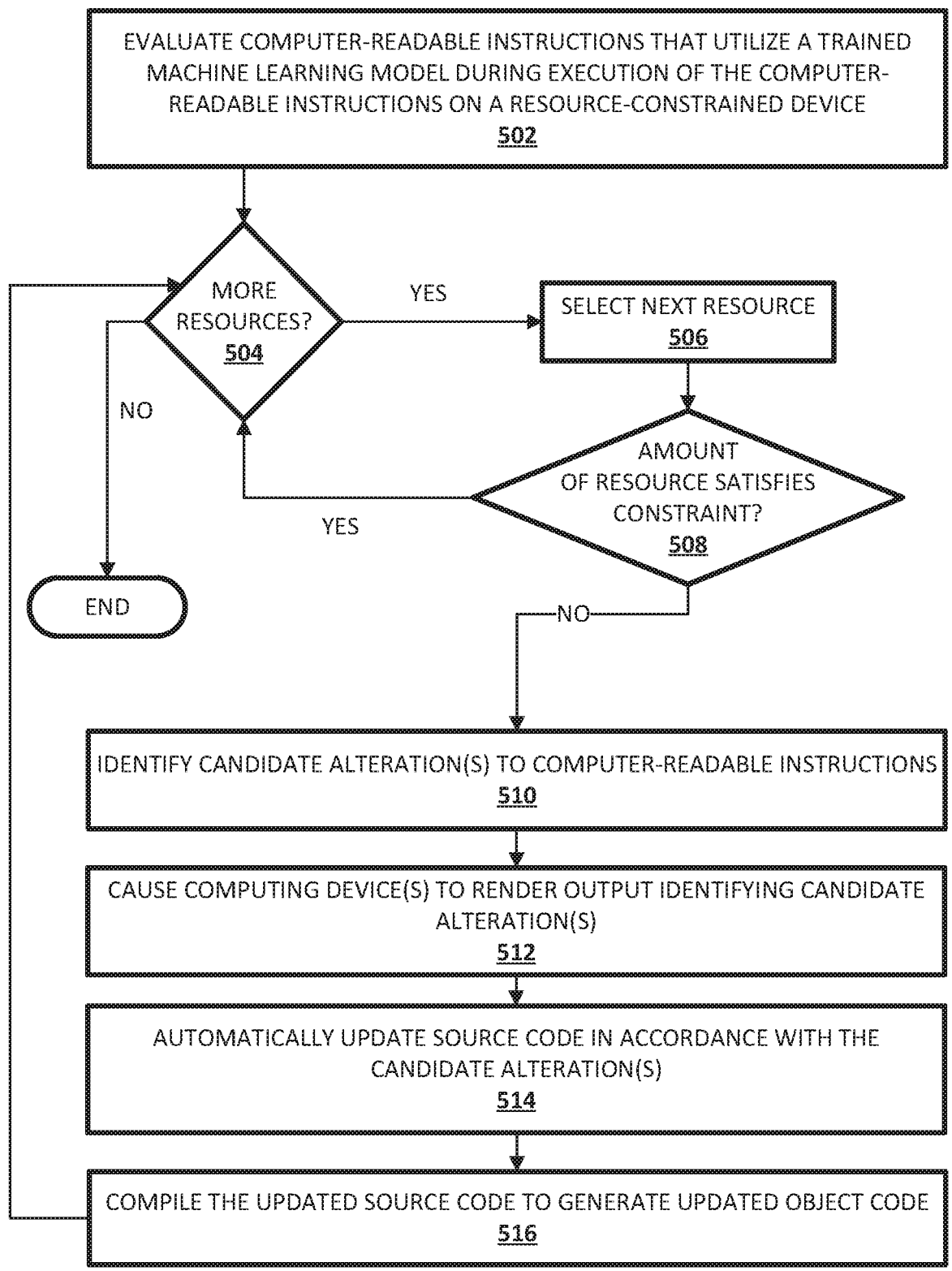
FIG. 5 and FIG. 6 depict example methods for practicing selected aspects of the present disclosure.

FIG. 5 illustrates a flowchart of an example method 500 for practicing selected aspects of the present disclosure. The steps of FIG. 5 can be performed by one or more processors, such as one or more processors of the various computing devices/systems described herein. For convenience, operations of method 500 will be described as being performed by a system configured with selected aspects of the present disclosure. Other implementations may include additional steps than those illustrated in FIG. 5, may perform step(s) of FIG. 5 in a different order and/or in parallel, and/or may omit one or more of the steps of FIG. 5.

At block 502, the system may evaluate computer-readable instructions that utilize or apply a trained machine learning model while the computer-readable instructions are executed on a resource-constrained device. At block 504, the system may determine whether there are more computing resources to consider. These resources may include non-volatile memory (e.g., FLASH), volatile memory (e.g., RAM), and computational power (e.g., computing cycles). If the answer at block 504 is no, then method 500 may end. However, if the answer at block 504 is yes, then method 500 may proceed to block 506, and the next computing resource may be selected.

At block 508, and in some cases based on the evaluating of block 502, at block 504, the system may determine whether an amount of the currently considered computing resource required by the resource-constrained device to execute the computer-readable instructions satisfies a constraint related to the current computing resource. For example and referring to FIG. 3, if the current computing resource being considered is non-volatile memory, the constraint may be, for instance, a minimum amount of non-volatile required to execute the software/firmware that applies the machine learning model in a manner that satisfies commercial/technical constraints.

At block 510, the system may, based on the determining of block 508, identify one or more candidate alterations to the computer-readable instructions that are associated with the constraint. Continuing with the non-volatile memory example, possible solutions in the problem-solution matrix of FIG. 3 include but are not limited to using smaller variable types, using lossy/lossless compression for machine learning model weights, etc. In some embodiments, at block 512, the system may cause one or more computing devices to render output, e.g., to a person in a position to make alterations during one or more phases 102-108 of FIG. 1, that conveys the candidate alteration(s) identified at block 510.

Additionally or alternatively, in some embodiments, the system may, at block 514, automatically update source code underlying object code forming the software/firmware in accordance with the one or more candidate alterations. At block 516, the system may compile the updated source code to generate updated object code.

Figure 6:
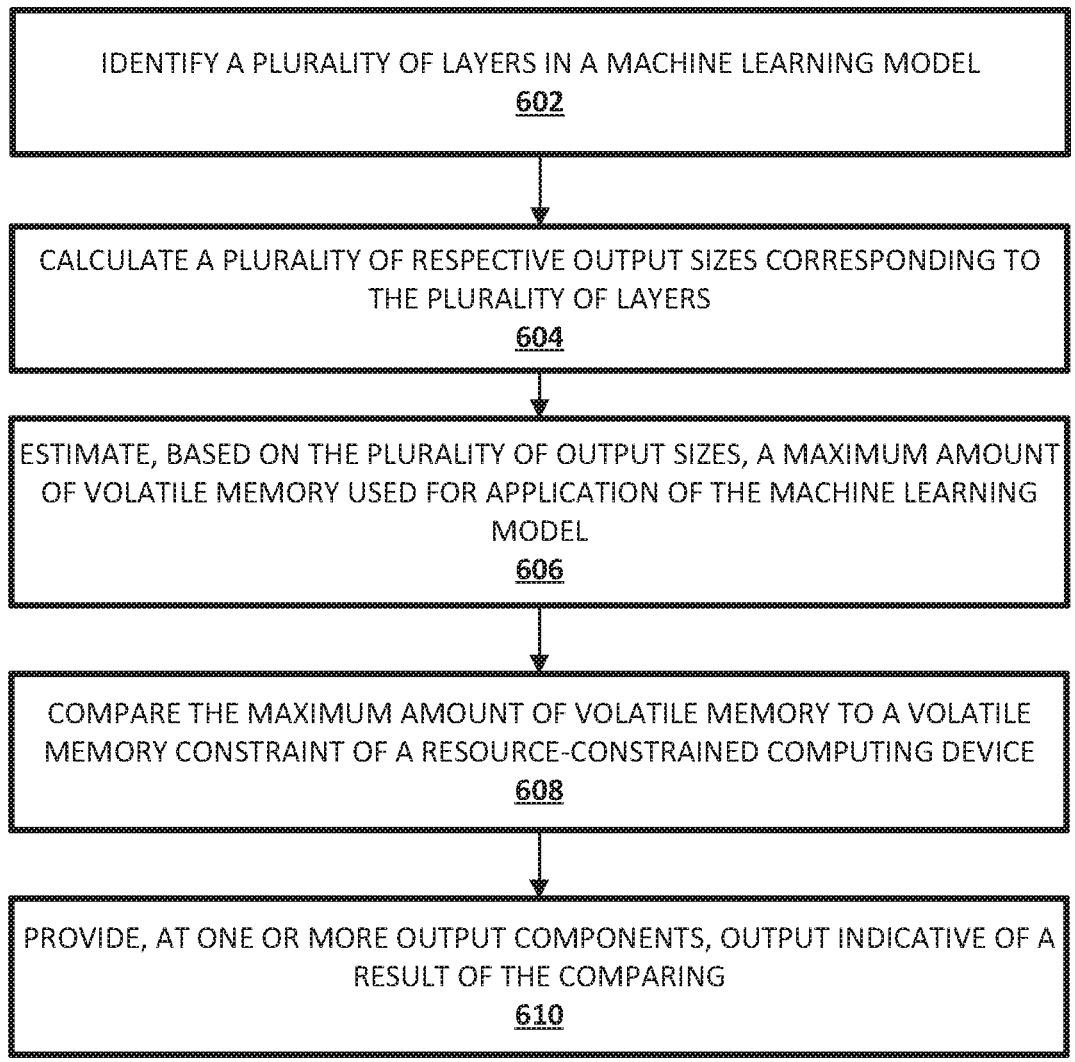

FIG. 6 illustrates a flowchart of an example method 600 for practicing selected aspects of the present disclosure. The steps of FIG. 6 can be performed by one or more processors, such as one or more processors of the various computing devices/systems described herein. For convenience, operations of method 600 will be described as being performed by a system configured with selected aspects of the present disclosure. Other implementations may include additional steps than those illustrated in FIG. 6, may perform step(s) of FIG. 6 in a different order and/or in parallel, and/or may omit one or more of the steps of FIG. 6.

At block 602, the system may identify a plurality of layers in a machine learning model. These layers may include, for instance, hidden layers, rectifier or "ReLU" layers, other types of activation layers, and so forth. In neural networks, for instance, each layer (other than a final downstream layer) may generate output that is used as input by one or more downstream layers. At block 604, the system may calculate a plurality of respective output sizes corresponding to the plurality of layers.

In some embodiments, the calculating of block 604 may include calculating a first output size corresponding to a first layer of the plurality of layers, calculating one or more additional output sizes corresponding to one or more downstream layers of the plurality of layers that receive, as input, output of the first layer; and determining that no more downstream layers of the plurality of layers receive, as input, output of the first layer.

At block 606, the system may estimate, based on the plurality of output sizes calculated at block 604, a maximum amount of volatile memory used for application of the machine learning model. As noted previously, this maximum amount may variously include a sum of all the plurality of output sizes or a sum of a subset of the plurality of output sizes. In the latter case, the subset of the plurality of output sizes may exclude one or more output sizes of the plurality of output sizes that correspond to one or more layers of the plurality of layers that are no longer needed at a given point in time during application of the machine learning model. For example, the one or more layers that are no longer needed may include one or more layers that no longer feed any downstream layers of the plurality of layers at the given point in time.

At block 608, the system may compare the maximum amount of volatile memory to a volatile memory constraint of a resource-constrained computing device. At block 610, the system may provide, at one or more output components, output indicative of a result of the comparing.

Figure 7:
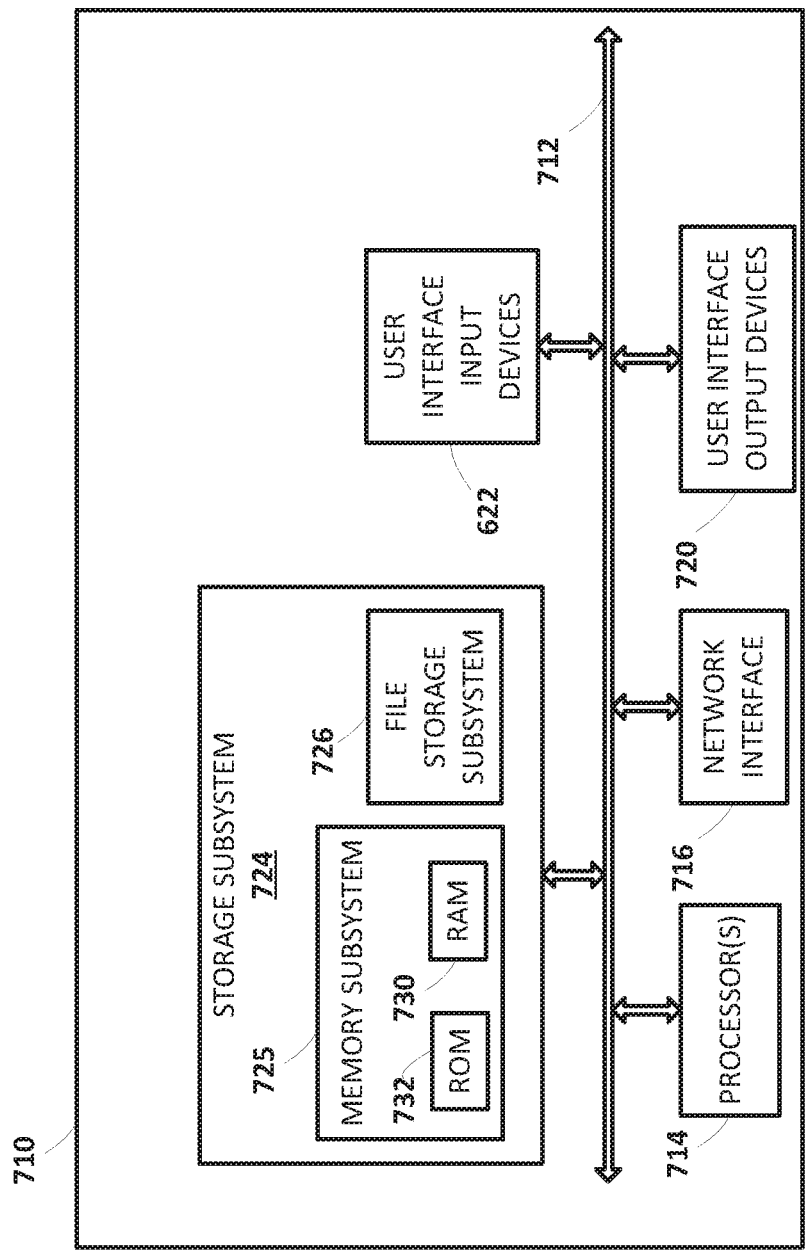
FIG. 7 depicts an example computer architecture.

FIG. 7 is a block diagram of an example computing device 710 that may optionally be utilized to perform one or more aspects of techniques described herein. Computing device 710 typically includes at least one processor 714 which communicates with a number of peripheral devices via bus subsystem 712. These peripheral devices may include a storage subsystem 724, including, for example, a memory subsystem 725 and a file storage subsystem 726, user interface output devices 720, user interface input devices 722, and a network interface subsystem 716. The input and output devices allow user interaction with computing device 710. Network interface subsystem 716 provides an interface to outside networks and is coupled to corresponding interface devices in other computing devices.

User interface input devices 722 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computing device 710 or onto a communication network.

User interface output devices 720 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computing device 710 to the user or to another machine or computing device.

Storage subsystem 724 stores programming and data constructs that provide the functionality of some or all of the modules described herein. For example, the storage subsystem 724 may include the logic to perform selected aspects of the method of FIGS. 2-6, as well as to implement various components depicted in FIG. 1.

These software modules are generally executed by processor 714 alone or in combination with other processors. Memory 725 used in the storage subsystem 724 can include a number of memories including a main random access memory (RAM) 730 for storage of instructions and data during program execution and a read only memory (ROM) 732 in which fixed instructions are stored. A file storage subsystem 726 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 726 in the storage subsystem 724, or in other machines accessible by the processor(s) 714.

Bus subsystem 712 provides a mechanism for letting the various components and subsystems of computing device 710 communicate with each other as intended. Although bus subsystem 712 is shown schematically as a single bus, alternative implementations of the bus subsystem may use multiple busses.

Computing device 710 can be of varying types including a workstation, server, computing cluster, blade server, server farm, or any other data processing system or computing device. Due to the ever-changing nature of computers and networks, the description of computing device 710 depicted in FIG. 12 is intended only as a specific example for purposes of illustrating some implementations. Many other configurations of computing device 710 are possible having more or fewer components than the computing device depicted in FIG. 12. In embodiments in which computing device 710 is a resource-constrained device, its processor 714 may be a relatively low-cost microprocessor or microcontroller that is selected to keep down costs associated with the consumer product in which it is installed.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03. It should be understood that certain expressions and reference signs used in the claims pursuant to Rule 6.2(b) of the Patent Cooperation Treaty ("PCT") do not limit the scope.

What is claimed is:

1. A method of implementing a trained machine learning model on a resource-constrained device, comprising:
    evaluating first computer-readable instructions that implement the trained machine learning model during execution of the first computer-readable instructions on the resource-constrained device;
    based on the evaluating, determining that an amount of a first computing resource of a plurality of computing resources required by the resource-constrained device to execute the first computer-readable instructions fails to satisfy a constraint related to the first computing resource;
    based on the determining, identifying one or more candidate alterations to the first computer-readable instructions, wherein the one or more candidate alterations are associated with the constraint;
    creating second computer-readable instructions that implement the trained machine learning based on and using the one or more candidate alterations; and
    embedding the second computer-readable instructions on the resource-constrained computing device.

2. The method of claim 1, further comprising causing one or more computing devices to render output, wherein the output identifies the one or more candidate alterations to an individual in a position to alter the first computer-readable instructions to create the second computer-readable instructions.

3. The method of claim 1, wherein the first and second computer-readable instructions each comprise executable object code.

4. The method of claim 3, further comprising: automatically updating first source code underlying the object code of the first computer-readable instructions in accordance with the one or more candidate alterations to generate second source code underlying the object code of the second computer-readable instructions; and compiling the second source code to generate the object code of the second computer-readable instructions.

5. The method of claim 1, wherein the first computing resource comprises read-only memory that stores information that remains constant during execution of the first computer-readable instructions.

6. The method of claim 1, wherein the first computing resource comprises volatile memory that stores information that changes during execution of the first computer-readable instructions.

7. The method of claim 1, wherein the first computing resource comprises computational power.

8. A system comprising one or more processors and memory storing instructions that, in response to execution of the instructions by the one or more processors, cause the one or more processors to implement a trained machine learning model on a resource-constrained computing device by:
    performing an evaluation of first computer-readable instructions that implement the trained machine learning model during execution of the first computer-readable instructions on the resource-constrained device;
    based on the evaluation, identifying respective amounts of a plurality of computing resources required by the resource constrained device to execute the first computer-readable instructions;
    determining that the amount of a first computing resource of the plurality of resources required by the resource-constrained device to execute the first computer-readable instructions fails to satisfy a constraint related to the first computing resource;
    based on the constraint, identifying one or more candidate alterations to the first computer-readable instructions
    creating second computer-readable instructions that implement the trained machine learning based on and using the one or more candidate alterations; and
    embedding the second computer-readable instructions on the resource-constrained computing device.

9. The system of claim 8, further comprising instructions to cause one or more computing devices to render output, wherein the output identifies the one or more candidate alterations to an individual in a position to alter the first computer-readable instructions to create the second computer-readable instructions.

10. The system of claim 8, wherein the first and second computer-readable instructions each comprise executable object code.

11. The system of claim 10, further comprising instructions to: automatically update first source code underlying the object code of the first computer-readable instructions in accordance with the one or more candidate alterations to generate second source code underlying the object code of the second computer-readable instructions; and compile the second source code to generate the object code of the second computer-readable instructions.

12. The system of claim 8, wherein the first computing resource comprises read-only memory that stores information that remains constant during execution of the first computer-readable instructions.

13. The system of claim 8, wherein the first computing resource comprises volatile memory that stores information that changes during execution of the first computer-readable instructions.

14. The system of claim 8, wherein the first computing resource comprises computational power.

15. At least one non-transitory computer-readable medium comprising instructions that, in response to execution of the instructions by one or more processors, cause the one or more processors to implement a trained machine learning model on a resource-constrained computing device by:
    evaluating first computer-readable instructions that a implement the trained machine learning model during execution of the first computer-readable instructions on the resource-constrained device;
    based on the evaluating, determining that an amount of a first computing resource required by the resource-constrained device to execute the first computer-readable instructions fails to satisfy a constraint related to the first computing resource;
    based on the constraint, identifying one or more candidate alterations to the first computer-readable instructions;
    creating second computer-readable instructions that implement the trained machine learning based on and using the one or more candidate alterations; and
    embedding the second computer-readable instructions on the resource-constrained computing device.

* * * * *